ns Patent [19]
Lacey et al.

[11] 3,976,592
[45] Aug. 24, 1976

[54] PRODUCTION OF MHD FLUID
[75] Inventors: James J. Lacey, Library; Roy C. Kurtzrock, Bethel Park; Daniel Bienstock, Pittsburgh, all of Pa.
[73] Assignee: The United States of America as represented by the United States Energy Research and Development Administration, Washington, D.C.
[22] Filed: Dec. 19, 1974
[21] Appl. No.: 534,328

Related U.S. Application Data
[63] Continuation-in-part of Ser. No. 344,320, March 23, 1973, Pat. No. 3,865,344.

[52] U.S. Cl. .................................................. 252/372
[51] Int. Cl.² .............................................. C01B 2/00
[58] Field of Search .................................... 252/372

[56] References Cited
OTHER PUBLICATIONS
"Direct Energy Conversion" 2nd ed. Angrist (1971) pp. 338, 339.

Primary Examiner—James O. Thomas, Jr.
Assistant Examiner—A. Siegel
Attorney, Agent, or Firm—Dean E. Carlson; Arthur A. Churm

[57] ABSTRACT

A hot gaseous fluid of low ash content, suitable for use in open-cycle MHD (magnetohydrodynamic) power generation, is produced by means of a three-stage process comprising (1) partial combustion of a fossil fuel to produce a hot gaseous product comprising $CO_2$, CO, and $H_2O$, (2) reformation of the gaseous product from stage (1) by means of a fluidized char bed, whereby $CO_2$ and $H_2O$ are converted to CO and $H_2$, and (3) combustion of CO and $H_2$ from stage (2) to produce a low ash-content fluid (flue gas) comprising $CO_2$ and $H_2O$ and having a temperature of about 4000° to 5000°F.

2 Claims, 1 Drawing Figure

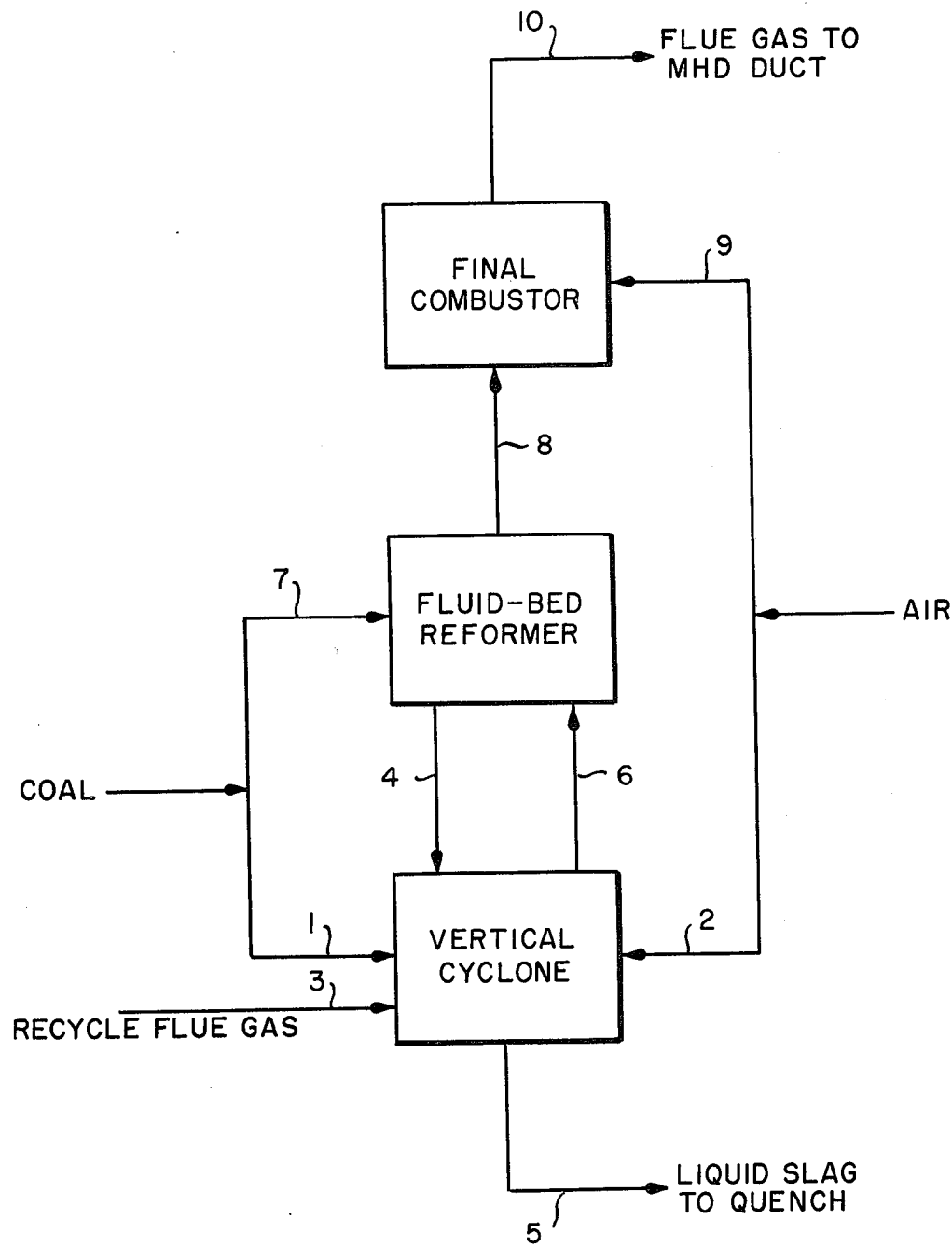

PRODUCTION OF MHD FLUID

This application is a continuation-in-part of application Ser. No. 344,320, filed Mar. 23, 1973 now U.S. Pat. No. 3,865,344.

Magnetohydrodynamics (MHD) is a process for the direct conversion of energy into electricity without the need for a conventional turbine or generator. Presently, the most promising MHD concept for central power generation uses high temperature gases from the combustion of fossil fuels such as coal to generate power. These gases, commonly referred to as flue gas, are seeded with an easily ionizable material such as cesium or potassium to attain an acceptable electrical conductivity. At temperatures below about 3600°F, the electrical conductivity falls too low for the MHD process to be attractive. A steam plant is then used to recover a part of the energy remaining in the gas stream. The use of such a binary cycle results in overall efficiencies in excess of 50% for flame temperatures in excess of 4400°F.

Such a process, however, requires the use of a clean flue gas, i.e., one having a low ash content, e.g., about 10% or less. In addition, the temperature of the gas must be suitably high, i.e., about 4000° to 5000°F. Prior art processes have been ineffective for production for hot, low-ash flue gas from readily available fossil fuel such as coal.

It has now been found, in accordance with the process of the invention, that a gas of low ash content and high temperature, suitable for use in open-cycle MHD power generation, may be produced by means of a three stage process comprising: (1) 1st stage-production of a hot gaseous product by partial combustion of a fossil fuel, (2) 2nd stage-reformation of the gaseous product from the 1st stage by means of a fluidized char bed, and (3) 3rd stage-combustion of the reformed gaseous product from the 2nd stage to produce a low ash content flue gas having a temperature of about 4000° to 5000°F.

The process of the invention will now be described in detail with reference to the FIGURE, which is a flow diagram of the essential process steps of the invention.

The 1st. stage consists of a combustor, oriented in the vertical direction and operated with deficient air, i.e., less than the stoichiometric air required for complete combustion. Such a combustor, operating in the substoichiometric range, produces CO rather than $CO_2$. This air deficiency is provided by simply regulating the in-flow of combustion air to the combustor for the purpose of partially oxidizing the carbon in the fuel. A cyclone type combustor is preferred; however, any conventional combustor capable of affecting the reactions discussed below may be used.

A fossil fuel with a high carbon to hydrogen ratio is the primary reactant. Coal is preferred; however, any fossil fuel could be used such as fuel oil or char. A source of oxygen is required, and due to its ready availability, air is preferred. A fraction of the product flue gas is introduced into the 1st stage, although it is not a reactant. It is used to control the temperature in the 1st stage, to provide carbon dioxide for the 2nd stage reformer, and to increase the mass flow rate throughout the unit. The FIGURE indicates the main reactants fed to the 1st stage. They are:

Stream No. 1 — coal
No. 2 — air
No. 3 — flue gas
No. 4 — char

Stream No. 4 is a product of the 2nd stage and will be discussed with the 2nd stage below. In the 1st stage, the char (stream No. 4) can be regarded as another fossil feed stream, with a much higher carbon to hydrogen ratio.

As mentioned above, the function of the 1st stage is to partially oxidize the fossil feed. The carbon and hydrogen in stream Nos. 1 and 4 are oxidized with the oxygen in stream No. 2. The essential chemical reactions are:

a. $C + O_2 \rightarrow CO_2$
b. $C + \frac{1}{2}O_2 \rightarrow CO$
c. $H_2 + \frac{1}{2}O_2 \rightarrow H_2O$ These are all exothermic reactions and, in order to regulate the reaction temperature, flue gas (stream No. 3) is introduced into the 1st stage to control its temperature. This will be more fully discussed below.

The principal products of the above reactions are carbon dioxide, carbon monoxide, and water, all in gaseous form. The fossil reactants, coal (stream No. 1) and char (stream No. 4) contain appreciable mineral matter ranging from 10 to 20 wt-%. In the 1st stage, this mineral matter is liquified and partially vaporized. The liquid portion flows out the bottom of the 1st stage as slag (stream No. 5), while the vaporized portion joins the other products of reaction and exits the 1st stage as stream No. 6. As regards the various streams, Table 1 gives typical compositions (in molar and weight units), pressures, and temperatures of each numbered stream shown on the FIGURE. These will, of course, vary somewhat with different types and sizes of reactors, different fuels, etc.

The preheated combustion air (stream No. 2) is normal atmospheric air that has been compressed and preheated by conventional means. The recycle flue gas (stream No. 3) consists of a portion, generally about 10 to 30 percent, of the product flue gas (stream No. 10) recycled to the 1st stage. Generally, this recycle flue gas will be withdrawn from the exit gases from the steam plant in the binary cycle power plant, with subsequent cleaning, compressing, and reheating in a manner similar to that used for the combustion air.

Typical compositions of the air and flue gas are shown in Table 1. The air (stream No. 2) is essentially atmospheric air. The flue gas typically has a composition of about 70–80 mol percent nitrogen, 0–0.2 mol percent oxygen, 0–1 mol percent argon, 0–10 mol percent water, 15–20 mol percent carbon dioxide, and a trace (less than 0.1 mol percent) of the oxides of sulfur and nitrogen.

In order to produce an acceptable MHD fluid (flue gas), it is necessary to operate at high temperatures and moderately high pressures. Accordingly, the air (stream No. 2) and recycle flue gas (stream No. 3) must be heated to the maximum temperature possible. This is generally within the range of about 2000° to 3000°F. This preheating can be accomplished by direct firing e.g., a furnace, or indirectly, e.g., a heat exchanger. This gas must also be compressed (preferably before preheating) to a pressure between about 3 and 30 atmospheres. The means used for the compression and preheating of streams Nos. 2 and 3 (and stream No. 9) are not essential aspects of the invention. Conventional equipment can be used to attain the desired pressures and temperatures.

Generally, the 1st. stage will operate in the range of 30–90% S.A. The rate of recycle flue gas introduced into the 1st. stage will generally vary between about 1/10 and 9/10 of the air rate on a molar basis. As shown in Table 1, a particular design featuring 550 lb/hr of dry coal fed to the 1st stage will require 3,130 lb/hr of air when the 1st stage is operating at 54.1% of the stoichiometric air requirements. The corresponding rate of recycle flue gas introduced into the 1st stage will be 1,106 lb/hr which is 0.35 of the 1st stage air rate on a molar basis.

One of the advantages of using a cyclone 1st stage is that it can process a rather wide range of fuel particle sizes, particularly of coal. The coal fed to the 1st. stage can vary from a coarsely pulverized coal (0 × 16 mesh) to a fine grind of 70% through 200 mesh. Generally, the coal particle size can vary from 50 to 1000 microns. It is introduced into the 1st stage via a conventional coal injection system that permits feeding of the pulverized coal, under a controlled rate, into a pressurized vessel. Such a system generally involves transporting the pulverized coal with an inert gas and introducing this mixture into the 1st stage. Normally this coal-gas mixture is introduced tangentially, such that it impinges on the walls of the reaction vessel. The rate at which it is introduced may vary from about 500 to 50,000 lb/hr depending on the size of the cyclone.

The recycle flue gas (stream No. 3) and the recycle char (stream No. 4) are also introduced tangentially, though generally directly opposite (180° away) from the coal injection point. The preheated air (stream No. 2) is generally equally split and introduced tangentially to a circle with a diameter equal to about ⅛ to ¾ of the 1st stage cyclone.

The operating temperature of the 1st stage is important. It must operate in the "slagging" region between about 3000° and 3600°F. Below about 3000°F, the liquid slag will not flow readily from the slag tap, and above about 3600°F an excessive amount of slag will vaporize and produce an undesirable fume. Suitable temperature is readily achieved by proper balancing of rates of reaction and introduction of flue gas.

The hot gases (stream No. 6) from the 1st stage are the products of the partial combustion of the fuel. There will also be some solids carried over from the 1st stage. Two types of solid carry-over losses are incurred. One involves unconsumed char particles. The amount of this loss is an inverse function of the air preheat and a direct function of the fuel to air ratio. In addition, a second loss is associated with entrained slag which results from the relatively high gas velocities normally maintained in the 1st stage. The composition of the 1st stage product, including solid and gaseous constituents, is indicated in Table 1 as stream No. 6.

The 1st stage is operated above the terminal velocity of the largest coal particle. This means that the 1st stage should operate in the range of 5 to 50 fps. However, this velocity would be too high for introducing the 1st stage gas into the 2nd stage fluid bed, hence the top of 1st stage vessel is constructed of increasing diameter to reduce this velocity to the range of about 1 to 10 fps.

In order to fluidize the char bed in the 2nd stage, the 1st stage gas must be distributed over the cross-section of the bed. The gas is, therefore, introduced into the fluid bed by means of a gas distribution grid. This preferably consists of a large, domed, refractory plate with holes through which the gas passes. There will generally be about 100 to 1000 of these holes, with diameters varying from about 0.3 to 3.0 inches. The gas velocity through these holes varies from about 50 to 500 fps.

As indicated above, the mineral matter of the coal is liquified and flows by gravity from the bottom of the 1st stage. By operating the 1st stage in the range of 3000° to 3600°F, slag having an acceptable viscosity, between about 100 and 1000 poises, is produced which will flow freely. This slag is subsequently quenched (with water), and withdrawn from the process. The use of a vertical cyclone insures a high efficiency of slag removal during combustion.

The 2nd stage consists essentially of a fluidized char bed reformer. The essential reactants are the hot gases (stream No. 6) from the 1st stage, particularly the $CO_2$ and $H_2O$ components. The other principal reactant is the carbon in the fluidized char bed. The reforming reactions taking place in the 2nd stage reformer are as follows:

a. $C + CO_2 \rightarrow 2CO$
b. $C + H_2O \rightarrow H_2 + CO$
c. Coal devolatilization Reactions a. and b. are highly endothermic and, accordingly, the temperature drops in the 2nd stage. The 2nd stage should operate in the "nonslagging" range, i.e., between about 1800° and 2500°F. The primary products from the 2nd stage are CO and $H_2$. Table 1 indicates a typical analysis for stream No. 8, the reformed gases, i.e., the 2nd stage products.

Reaction c, the devolatilization of coal, results when coal is heated, thereby losing its volatile hydrocarbon content and producing char. The char has variable properties, depending on length of residence in the bed and the degree of reaction with oxygen, carbon dioxide, and water vapor. Thus, when coal is fed to the fluid bed reformer, it is rapidly heated to the operating temperature in the bed, and is converted to a char which further reacts with the gases present in the bed. The volatile matter liberated from the raw coal in the fluid bed is cracked and reformed by the combustion products ($H_2O$, $CO_2$) from the 1st stage. The injection of the raw coal (stream No. 7) provides make-up for the carbon (char) being consumed by the chemical reactions mentioned above.

The products from the 1st stage enter the 2nd stage and thereby fluidize the bed as described above. After passing through the distribution grid nozzles (holes), the gas enters the fluid char bed where the reforming reactions take place. The fluid bed normally operates at two different velocities. The lower part, or layer, into which the 2nd stage coal (stream No. 7) is introduced generally operates at velocities of about 0.1 to 10 fps. The upper part of the bed operates between about 0.03 and 3 fps to minimize char carry-over into the 3rd stage.

The ratio of the 2nd to 1st stage coal rates varies between about 0.1 and 10.0. The particle size range of the 2nd stage coal (stream No. 7) is the same as the range of that fed to the 1st stage (stream No. 1); i.e., it can vary between 50 and 1000 microns; however, it need not be identical.

The fluid bed operation is similar to that used in conventional reforming or cracking operations. The optimum type of char used will vary with the type of coal processed. Below are typical char data.

|  | % by Weight | |
|---|---|---|
|  | Illinois No. 6 Char | Pittsburgh Seam Char |
| Moisture | 1.4 – 2.3 | 0.4 – 0.8 |
| Volatile matter | 3.1 – 5.6 | 1.7 – 2.7 |
| Fixed carbon | 55.7 – 68.9 | 70.0 – 77.0 |
| Ash | 25.5 – 39.8 | 20.6 – 27.1 |
| Sulfur | 0.8 – 1.2 | 0.2 – 0.4 |

The following characteristics are typical of suitable chars:

| Bulk density | 17.6–25 lb/ft$^3$ |
|---|---|
| Solid particle density | 40–65 lb/ft$^3$ |
| Angle of repose | 31° |
| Sieve mesh analysis, | |

| Microns | % by weight smaller than |
|---|---|
| 600 | 82 |
| 400 | 68 |
| 200 | 43 |
| 100 | 28 |
| 50 | 20 |
| 30 | 13 |
| 20 | 8 |
| 10 | 3 |
| 5 | 0.6 |

The dimensions of the char bed are those required to maintain the above-mentioned velocities, i.e., lower part of bed 0.1–10 fps and upper part of bed 0.03–3 fps. This bed is retained by means of dust cyclones positioned in the top of the 2nd stage, as more fully discussed below.

The purpose of the fluid char bed is to produce CO and $H_2$ as indicated above. The temperature drop resulting from these endothermic reactions allows the condensation of the ash which was vaporized in the 1st stage. The bed itself traps and/or filters the unconsumed char particles from the 1st stage by mechanical action. These trapped solids, along with excess coal (char) injected for make-up as mentioned above, tend to increase the char bed volume. A simple overflow leg, or well, also conventional, permits this excess material to be withdrawn and recycled back to the 1st stage as stream No. 4. The collected char builds up a static head (the settled density of the char is much greater than its fluidized density) sufficient to permit its reinjection into the 1st stage, preferably with the recycle flue gas as a carrier.

The reformed gas (stream No. 8) leaving the 2nd stage exits through conventional dust cyclones. These are inertial separators without moving parts. They separate particulate matter from a carrier gas by transforming the velocity of an inlet stream into a double vortex confined within the cyclone. In the double vortex, the entering gas spirals downward at the outside and spirals upward at the inside of the cyclone outlets, which discharges to the 3rd stage (final) combustor. The particulates, because of their inertia, tend to move toward the outside wall, from which they are returned by gravity to the 2nd stage fluid bed.

The 3rd stage consists of a compact conventional gas-fired combustor, the design of which preferably provides axial flow of the hot fuel gas (stream No. 8) from the 2nd stage fluid bed reformer. Preheated air (stream No. 9) enters the 3rd stage combustor radially through holes in the refractory lining of the combustion zone. This technique, known as "transpiration cooling," reduces combustor heat losses, while providing additional preheat for the combustion air (stream No. 9) and a lower operating temperature for the containing refractories.

The 3rd stage reactants are the 2nd stage reformed gases (stream No. 8) containing $H_2$ and CO, and the 3rd stage air (stream No. 9). The reactions are:

$$H_2 + \tfrac{1}{2}O_2 \rightarrow H_2O$$

$$CO + \tfrac{1}{2}O_2 \rightarrow CO_2$$

These are exothermic reactions and raise the exit (flue) gas (stream No. 10) to the desired temperature (4000°–5000°F).

The source and composition of the 3rd stage combustion air (stream No. 9) is the same as the 1st stage air (stream No. 2) described above. The amount of 3rd stage air is regulated by conventional flow control devices such that the total air (stream Nos. 2 and 9) relative to the total coal fed (stream Nos. 1 and 7) represents between about 80 and 120% of the stoichiometric requirements.

TABLE 1

Basis: 850 lb/hr of Dry Coal

| Stream No.: | | (1) | | (2) | | (3) | | (4) | | (5) | |
|---|---|---|---|---|---|---|---|---|---|---|---|
| Flow Stream | Components | mol/hr | lb/hr | mol/hr | lb/hr | mol/hr | lb/hr | mol/hr | lb/hr | mol/hr | lb/hr |
| Solid or | C | 35.259 | 423.50 | | | | | | | | |
| Liquid | $C_8H$ | 0.0 | 0.0 | | | | | 0.486 | 47.20 | | |
|  | $O_2$ | 0.859 | 27.50 | | | | | | | | |
|  | $H_2$ | 13.641 | 27.50 | | | | | | | | |
|  | S | 0.343 | 11.00 | | | | | 0.025 | 0.80 | | |
|  | $N_2$ | 0.196 | 5.50 | | | | | | | | |
|  | $H_2O$ | 1.273 | 22.94 | | | | | | | | |
|  | Ash | 0.714 | 55.00 | | | | | 0.742 | 46.69 | 1.047 | 78.75 |
|  | Subtotal | 52.285 | 572.94 | — | — | — | — | 1.253 | 94.69 | 1.047 | 78.75 |
| Gaseous | $CO_2$ | | | 0.032 | 1.427 | 6.177 | 271.86 | | | | |
|  | CO | | | 0.0 | 0.0 | 0.0 | 0.0 | | | | |
|  | $H_2O$ | | | 1.309 | 24.65 | 2.737 | 49.31 | | | | |
|  | $H_2$ | | | 0.0 | 0.0 | 0.0 | 0.0 | | | | |
|  | $S_2$ | | | 0.0 | 0.0 | 0.019 | 1.20 | | | | |
|  | $N_2$ | | | 83.727 | 2,345.10 | 27.451 | 769.06 | | | | |
|  | $O_2$ | | | 22.468 | 719.00 | 0.043 | 1.38 | | | | |
|  | A | | | 0.998 | 39.89 | 0.338 | 13.48 | | | | |
|  | Ash | | | 0.0 | 0.0 | 0.0 | 0.0 | | | | |
|  | X | | | 0.0 | 0.0 | 0.0 | 0.0 | | | | |
|  | Subtotal | — | — | 108.534 | 3,130.67 | 36.765 | 1,106.29 | — | — | — | — |
| Grand Total | | 52.285 | 572.94 | 108.534 | 3,130.67 | 36.765 | 1,106.29 | 1.253 | 94.69 | 1.047 | 78.75 |
| Temperature, °F | | 77 | | 2100 | | 2100 | | 2300 | | 2800 | |

TABLE 1-continued

Basis: 850 lb/hr of Dry Coal

| Flow Stream | Stream No.: Components | (6) mol/hr | (6) lb/hr | (7) mol/hr | (7) lb/hr | (8) mol/hr | (8) lb/hr |
|---|---|---|---|---|---|---|---|
| Solid or Liquid | C | | | 19.233 | 231.00 | | |
| | $C_nH$ | 0.486 | 47.20 | 0.0 | 0.0 | 0.801 | 77.80 |
| | $O_2$ | | | 0.468 | 15.00 | | |
| | $H_2$ | | | 7.440 | 15.00 | | |
| | S | 0.025 | 0.80 | 0.187 | 6.00 | 0.041 | 1.33 |
| | $N_2$ | | | 0.107 | 3.00 | | |
| | $H_2O$ | | | 0.695 | 12.51 | | |
| | Ash | 0.120 | 6.00 | 0.390 | 30.00 | 0.140 | 6.25 |
| | Subtotal | 0.631 | 54.00 | 28.520 | 312.51 | 0.982 | 85.38 |
| Gaseous | $CO_2$ | 10.665 | 469.377 | | | 4.550 | 200.250 |
| | CO | 30.803 | 862.823 | | | 49.748 | 1,393.491 |
| | $H_2O$ | 11.826 | 213.057 | | | 5.364 | 96.638 |
| | $H_2$ | 7.137 | 14.388 | | | 21.364 | 43.070 |
| | $S_2$ | 0.037 | 2.392 | | | 0.252 | 16.144 |
| | $N_2$ | 111.374 | 3,120.260 | | | 111.481 | 3,123.260 |
| | $O_2$ | 0.00001 | 0.003 | | | 0.0 | 0.0 |
| | A | 1.336 | 53.370 | | | 1.336 | 53.370 |
| | Ash | 0.380 | 16.940 | | | 0.0 | 0.0 |
| | X | 0.669 | 19.223 | | | 1.002 | 32.057 |
| | Subtotal | 174.257 | 4,771.840 | — | — | 195.097 | 4,958.280 |
| Grand Total | | 174.888 | 4,825.840 | 28.520 | 312.51 | 196.079 | 5,043.660 |
| Temperature, °F | | 3250 | | 77 | | 2300 | |

| Flow Stream | Stream No.: Components | (9) mol/hr | (9) lb/hr | (10) mol/hr | (10) lb/hr |
|---|---|---|---|---|---|
| Solid or Liquid | C | | | | |
| | $C_nH$ | | | | |
| | $O_2$ | | | | |
| | $H_2$ | | | | |
| | S | | | | |
| | $N_2$ | | | | |
| | $H_2O$ | | | | |
| | Ash | | | | |
| | Subtotal | — | — | — | — |
| Gaseous | $CO_2$ | 0.066 | 2.71 | 49.681 | 2,186.56 |
| | CO | 0.0 | 0.0 | 11.100 | 310.92 |
| | $H_2O$ | 2.596 | 46.77 | 27.585 | 496.97 |
| | $H_2$ | 0.0 | 0.0 | 0.893 | 1.80 |
| | $S_2$ | 0.0 | 0.0 | 0.0 | 0.0 |
| | $N_2$ | 158.752 | 4,447.51 | 270.233 | 7,570.77 |
| | $O_2$ | 42.603 | 1,363.30 | 6.335 | 202.70 |
| | A | 1.892 | 75.64 | 3.228 | 129.01 |
| | Ash | 0.0 | 0.0 | 0.139 | 6.25 |
| | X | 0.0 | 0.0 | 2.313 | 74.61 |
| | Subtotal | 205.909 | 5,935.93 | 371.507 | 10,979.59 |
| Grand Total | | 205.909 | 5,935.93 | 371.507 | 10,979.59 |
| Temperature, °F | | 2100 | | 4375 | |

X — Misc. ($SO_x$, $NO_x$, OH, KCH, etc).

We claim:

1. A process for preparation of a hot gaseous fluid of low ash content, suitable for use in open-cycle MHD power generation, comprising (1) partial combustion of a fossil fuel selected from the group consisting of coal, char, and fuel oil by means of preheated air at a temperature of about 2000° to 3000°F. and a pressure of about 3 to 30 atmosphere to produce a hot gaseous product comprising $CO_2$, CO, and $H_2O$, (2) reformation of the gaseous product from (1) by means of a fluidized bed, including char, whereby $CO_2$ and $H_2O$ are converted to CO and $H_2$, and (3) combustion of CO and $H_2$ from (2) by reaction with preheated air to produce a low-ash-content gaseous product comprising $CO_2$ and $H_2O$ and having a temperature of about 4000° to 5000°F.

2. The process of claim 1 in which the fuel is coal.

* * * * *